Patented Nov. 14, 1944

2,362,477

UNITED STATES PATENT OFFICE 2,362,477

AZO DYESTUFF

Joseph F. Froning, Wilmington, Del., assignor to E. I. du Pont de Nemours & Company, Wilmington, Del., a corporation of Delaware No Drawing. Application June 12, 1943, Serial No. 490,642

3 Claims. (Cl. 260—159)

This invention relates to a scarlet azo dyestuff for cotton fabrics.

The art has need of a scarlet azo dyestuff fast to washing which will discharge more perfectly than the colors used for that purpose at the present time. In one form of discharge printing, as practiced in the art, cotton fabric is dyed with a selected color and overprinted with a discharge paste which is applied in a pattern from a printing roller or in other known ways. The discharge paste destroys the color at the points to which it is applied, and the disintegrated elements of the color are washed out of the fabric. The effect of the discharge varies widely with different colors, with some being ineffective and with others effective to a high degree. Perfection of discharge it attained only when the discharged cloth has been left without a trace of stain. This condition is but rarely attained.

It is an object of this invention to prepare an azo color having superior discharge and exceptional fastness to washing. Fastness to washing is particularly important in these colors because of the washing which follows the discharge.

The objects of the invention are accomplished by the preparation of the color represented by the formula:

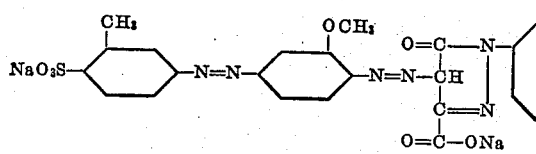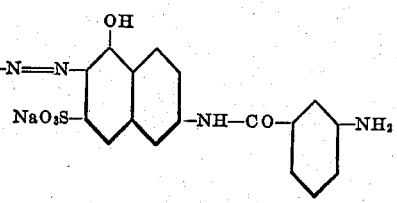

which is produced by diazotizing 3-amino-toluene-6-sulfonic acid and coupling it to ortho-anisidine, diazotizing the product and coupling it to meta-amino-phenyl-pyrazolone-carboxylic acid, diazotizing the product and coupling it to meta-amino-benzoyl-J-acid. This color has an additional advantage in that it may be diazotized on the fiber and coupled to beta-naphthol. The developed color is somewhat stronger. The developed color, when bleached with alkaline or neutral discharge paste, gives an excellent discharge.

The following example illustrated the invention:

Example 187 parts of 3-amino-toluene-6-sulfonic acid as the sodium salt was dissolved in 2000 parts of water and diazotized by the addition of 250 parts of 10 normal hydrochloric acid and 200 parts of 5 normal sodium nitrite solution at 10° C. Excess nitrous acid was removed by the addition of sulfamic acid, according to the process of Lubs (U. S. Patent 2,160,882) and 135 parts of o-anisidine was added. After stirring several hours the resulting insoluble monazo compound was filtered off and washed. It was then dissolved with enough sodium hydroxide in 2000 parts of water at 50° C. to give a slightly alkaline solution which was clarified with charcoal. This amino azo compound was then diazotized at 30° C. by the addition of 180 parts of 10 normal hydrochloric acid and 120 parts of 5 normal sodium nitrite solution, and the resulting diazo compound was added at 10° C. to a solution of 130 parts of 1-(3'-amino-phenyl)-5-pyrazolone-3-carboxylic acid and 112 parts of 10 normal sodium hydroxide solution and 100 parts sodium carbonate in 2000 parts water. The resulting disazo color was salted out at 60° C. and filtered and washed with brine. It was then redissolved in 2000 parts water at 60° C., filtered and treated with 120 parts of 5 normal sodium nitrite solution and 180 parts of 10 normal hydrochloric acid at 15° to 20° C. to form the diazonium compound, which was added at 10° C. to a solution of 220 parts m-amino-benzoyl-J-acid and 64 parts of 10 normal sodium hydroxide solution and 120 parts sodium carbonate in 2000 parts water. The resulting trisazo color was salted out, filtered, and washed with brine. When dried and ground, it was a red powder. It dyed cotton cloth a scarlet color. Ten grams of this dyed cotton cloth was wet with water and put into 250 cc. of an aqueous solution of 0.3 g. of sodium nitrite and 0.4 g. of sulfuric acid and occasionally turned for 20 minutes at room temperature, then removed, rinsed with water and put into 250 cc. of an aqueous solution of 0.1 g. of beta-naphthol and 0.05 g. of sodium hydroxide at room temperature. After 20 minutes, the dyed cloth was removed, rinsed and dried. The resulting shade was stronger than before the treatment with beta-naphthol and had very good fastness to washing. When treated with neutral or alkaline discharge pastes, the developed color was bleached, and an excellent discharge of the color was obtained.

This dye is of particular use where washable cotton or rayon goods are dyed scarlet. A neutral discharge paste may be used satisfactorily to produce a white pattern on a red background. An alkaline discharge paste containing printing colors produce colored patterns on a red background.

As many apparently widely different embodiments of this invention may be made without departing from the spirit and scope thereof, it is to be understood that I do not limit myself to the specific embodiments thereof except as defined in the appended claims.

I claim:
1. The scarlet dyestuff represented by the formula 3-amino-toluene-6-sulfonic acid→ortho-anisidine→meta - amino - phenyl - pyrazolone-carboxylic acid→meta-amino-benzoyl-J-acid.
2. Cotton dyed with the dyestuff of claim 1 diazotized, and developed with beta-naphthol.
3. The process of preparing a scarlet dyestuff which comprises coupling 3-amino-toluene-6-sulfonic acid diazo to ortho-anisidine, diazotizing the product and coupling it to meta-amino-phenyl - pyrazolone - carboxylic acid, diazotizing the product and coupling it to meta-amino-benzoyl-J-acid.

JOSEPH F. FRONING.